United States Patent [19]
Free

[11] Patent Number: 5,567,740
[45] Date of Patent: Oct. 22, 1996

[54] CONDUCTIVE POLYURETHANE FOAM COMPOSITIONS AND METHOD FOR PRODUCING SAME

[75] Inventor: Sharon A. Free, Wallingford, Pa.

[73] Assignee: Foamex, L.P., Linwood, Pa.

[21] Appl. No.: 483,377

[22] Filed: Jun. 7, 1995

[51] Int. Cl.$^6$ ............................... C08G 08/38; A01B 1/00
[52] U.S. Cl. ........................ 521/128; 252/500; 521/123
[58] Field of Search .................................. 521/123, 128; 252/500

[56] References Cited

U.S. PATENT DOCUMENTS 5,180,755  1/1993  Yasunaga et al. ..................... 521/116

*Primary Examiner*—Morton Foelak
*Attorney, Agent, or Firm*—Connolly & Hutz

[57] ABSTRACT

The present invention relates to three-dimensional expanded polyurethane foam materials, such as flexible reticulated polyurethane foam compositions, that are electrically conductive and have antistatic properties. More specifically, the invention relates to a polyurethane foam having long-lasting and reliable electrical conductivity characteristics and a volume resistivity of approximately $10^{12}$ ohm·cm or less at ambient room temperature (about 70° F.). This foam is produced by combining conventional polyurethane foam-forming reactants and an effective amount of an antistatic agent such as tetracyanoquinodimethane (TCNQ) or sodium perchlorate under foam-forming conditions. In one preferred embodiment, the conductive foam is subsequently reticulated by momentary exposure to a flame front.

12 Claims, No Drawings

CONDUCTIVE POLYURETHANE FOAM COMPOSITIONS AND METHOD FOR PRODUCING SAME

BACKGROUND OF THE INVENTION

1. Field of the Invention

The present invention relates to three-dimensional expanded polyurethane foam materials, such as flexible reticulated polyurethane foam compositions, that are electrically conductive and have antistatic properties. More specifically, the invention relates to a polyurethane foam having long-lasting and reliable electrical conductivity characteristics and a volume resistivity of approximately $10^{12}$ ohm·cm or less at room temperature (about 70° F.). This foam is produced by combining conventional polyurethane foam-forming reactants and an effective amount of an antistatic agent, such as tetracyanoquinodimethane (TCNQ) or sodium perchlorate, under foam-forming conditions. In one preferred embodiment, the conductive foam is subsequently reticulated by momentary exposure to a flame front.

2. Description of the Prior Art

It has long been known that it is not possible to generate an explosion of any fuel/air mixture in the presence of reticulated polyurethane foam structures. Because of this characteristic of reticulated polyurethane foam and the additional benefits of light weight, minimal reduction in a fuel tank's usable space and attenuation of violent surging of fuel, reticulated polyurethane foam structures have found extensive use in military aircraft and land vehicles. These properties reduce the vulnerability of these vehicles by providing protection against explosive ballistic hits, explosions following fuel tank rupture, explosive static discharge and explosions caused by lightning.

Unfortunately, the use of foam can give rise to a different danger. Since the foam has a low electrical conductivity (or as more conveniently measured, a high electrical resistivity), there can be a buildup of electrostatic charges and the electrostatic charges can result in sparking, leading to a fire or explosion within the non-foam containing areas of the fuel tank. The build-up of electrostatic charges can also adversely effect sensitive aircraft instrumentation.

Consequently, it is an object of this invention to provide a foam for fuel tanks which minimizes the possibility of fuel explosion from gunfire, electric ignition and lightning. It is a further object of this invention to provide a foam which has a higher electrical conductivity needed to minimize the danger of sparking caused by the build-up of electrostatic charges. It is a further object of this invention to provide fuel tanks which minimize the release of fuel in the event of rupture and which resist sparking due to the build-up of electrostatic charge.

U.S. Pat. No. 4,886,626 (Cope et al.) describes a conductive polyurethane foam which contains a charge transfer agent selected from the group consisting of tetracyanoethylene (TCNE), picric acid and analogs thereof. These foams exhibit electrical resistivities (i.e., volume resistivities) of $10^{12}$ ohm·cm or less. However, these foams suffer from the disadvantage that the charge transfer materials used in the foams are dangerous to handle. For example, TCNE is highly toxic and picric acid and its derivatives are explosive.

SUMMARY OF THE INVENTION

It is an object of the invention to provide an electrically conductive polyurethane foam that is suitable for use as a filler material in fuel containers or tanks, particularly in vehicles having combustion powered engines, wherein the polyurethane foam does not contain any highly toxic substances such as TCNE.

It is another object of the invention to provide a stable, reliable and long-lasting electrically conductive reticulated polyurethane foam structure that retains its conductivity characteristics despite repeated mechanical abrasion and use at low temperatures (e.g., 0° F. to −30° F.), high temperatures (e.g., 120° F. to 160° F.), organic fluids and aqueous fluids.

A further object of the present invention is to provide an electrically conductive reticulated polyurethane foam having a void volume greater than at least about 80%, and preferably more than about 90%, using relatively small quantities of the agent conferring electrical conductivity in the foam forming reaction mixture.

Another object of the present invention is an electrically conductive thermally reticulated polyurethane foam prepared from a polyol and an isocyanate and containing about 0.08 to 0.20 parts of TCNQ per hundred parts by weight of polyol (php) in the foam forming mixture. In a preferred embodiment of the present invention, the electrically conductive thermally reticulated polyurethane foam contains from 0.08–0.15 php of TCNQ in the foam forming mixture. In a particularly preferred embodiment of the present invention, the electrically conductive thermally reticulated polyurethane foam contains from 0.10–0.15 php of TCNQ in the foam forming mixture.

A still further object of the present invention is an electrically conductive thermally reticulated polyurethane foam prepared from a polyol and an isocyanate and containing about 0.06 to 1.00 parts of sodium perchlorate ($NaClO_4$) per hundred parts by weight of polyol (php), preferably 0.06 to 0.80 php sodium perchlorate and most preferably 0.075 to 0.80 php sodium perchlorate, in the foam forming mixture. Since sodium perchlorate, by itself, is a potentially explosive material, it is preferable to use a solution of sodium perchlorate in an aqueous or organic solvent during the foam forming procedure. A preferred sodium perchlorate solution is MP100 (from Akishima Chemical Industries Co., Ltd., Tokyo, Japan), which is a solution of 30–40% by weight sodium perchlorate in diethylene glycol methyl ether. Accordingly, when MP100 is used as the source of sodium perchlorate in the foam forming mixture, the following amounts of MP100 are used: 0.20 to 2.50 parts of MP100 per hundred parts by weight of polyol (php), preferably 0.20 to 2.00 php MP100 and most preferably 0.25 to 2.00 php MP100, in the foam forming mixture.

It is another object of the present invention to provide a polyurethane foam composition having a non-degrading electrical volume resistivity of less than about $10^{12}$ ohm·cm (at room temperature) and a lower volume resistivity at low temperatures (e.g., 0° F. to −30° F.) than conventional polyurethane foams.

The objects of the invention are achieved by providing an electrically conductive polyurethane foam, wherein the electrical resistivity of the foam is desirably decreased to approximately $10^{12}$ ohm·cm or less by the integral incorporation of relatively small yet effective amounts of a specific antistatic agent (i.e., TCNQ or sodium perchlorate) into the structure of the foam during foam formation.

Advantageous polyurethane foam forming reactants include well-known polyester and polyether polyols and diisocyanate compounds. Additional reaction materials include water, catalyst compounds, and cell control agents. According to the invention, the effective amount of antistatic agent (e.g., TCNQ or sodium perchlorate) ranges from about 0.08 to 0.20 parts per hundred parts polyol (php), preferably 0.08 to 0.15 php and most preferably 0.10–0.15 php, when the antistatic agent is TCNQ and from about 0.06 to 1.00 php, preferably 0.06 to 0.80 php and most preferably 0.075 to 0.80 php, when the antistatic agent is sodium perchlorate.

Surprisingly, the electrical conductivity properties afforded by in situ incorporation of TCNQ or sodium perchlorate survive the exotherm (on the order of about 300° F.) accompanying polyurethane foam formation, subsequent reticulation of the foam under plasma temperature conditions (of about 2000° F. or more), mechanical abrasion, use at low temperatures (e.g., 0° F. to −30° F.) and high temperatures (e.g., 120° F. to 160° F.) and long-term exposure to aqueous and organic fluids. Accordingly, the foam products of the invention are particularly well suited for use as an antistatic material, for example as a filler in aircraft fuel tanks or as a packaging material for delicate electronic components.

According to the invention, a conductive polyurethane foam is formed in situ, by known means, using conventional foam forming reactants comprising one or more polyols, an isocyanate compound or composition, and an effective amount of an antistatic agent such as TCNQ or sodium perchlorate, for providing said polyurethane foam with an electrical resistivity of less than $1 \times 10^{12}$ ohm·cm at ambient room temperature (about 70° F.).

According to the present invention a polyether or polyester urethane foam is formed from isocyanate and hydroxyl containing (polyol) reactants by known means, but with the antistatic agent incorporated into the reaction mixture prior to foam formation. The resulting polyurethane foam has a solids volume of from about 2% to about 3.3% and a void volume of from about 96.7% to about 98%. The resulting polyurethane foam may thereafter be reticulated. For example, the foam can be reticulated according to the thermal reticulation method taught in Geen et al., U.S. Pat. No. 3,175,025 which is incorporated herein by reference or by any of the other thermal reticulation methods known in the art. In preparing electrically conductive polyurethane foams for use as fuel tank filler materials, graft polyols are preferred as the polyol constituent of the foam. One preferred graft copolymer is an ethylene oxide propylene oxide ether of glycerin to which a copolymer of styrene and acrylonitrile has been grafted. The invention is not limited, however, to the use of these graft materials as the polyol constituent. The flexible three dimensional polyurethane foams of the invention may be prepared by reacting isocyanate compounds with polyether polyols, polyester polyols, mixtures of polyether polyols and copolymer polyols such as, for example, the grafted polyether containing styrene and acrylonitrile as described above, in the presence of the antistatic agent. The resulting electrically conductive polyurethane foams exhibit a resistivity of about $10^{12}$ ohm·cm or less at ambient room temperature, and retain this advantageously decreased electrical resistivity despite exposure to exothermic foam forming conditions, relatively violent high temperature reticulation procedures, immersion in water or fuel, use at low temperatures (e.g., 0° F. to −30° F.) and high temperatures (e.g., 120° F. to 160° F.) and dry heat aging.

DETAILED DESCRIPTION OF THE INVENTION

The invention is described with reference to a number of examples and embodiments, and with reference to a number of comparative tests. It will be understood by skilled practitioners that these examples, embodiments and comparisons are illustrative only and do not limit the scope of the invention.

The polyurethane foams of the present invention may be prepared using the one shot or the pre-polymer methods that are well known to the art and in which hydroxyl containing ingredients (polyols) and polyisocyanates are combined in the presence of well known catalysts, blowing agents, foam stabilizers, flame retardants, pigments and extenders. Polyester based polyurethanes, polyether based polyurethanes, copolymer polyol based polyurethanes and mixtures of these substances may be used in making the conductive foams of the present invention, although polyether foams are preferred.

The polyisocyanate ingredients that are useful in the present invention include, but are not limited to, toluene diisocyanate (TDI), which is preferred, and polymers of diphenylmethane 4,4' diisocyanate (MDI).

Representative hydroxyl containing ingredients for use in the invention include polyester and polyether polyols such as, for example, the polypropylene glycol adipate glycerine ester and the ethylene oxide propylene oxide ether of glycerin. Graft copolymers of hydroxyl containing constituents which may also be employed as polyol constituents in practicing the invention include ethylene oxide propylene oxide ether of glycerin to which various amounts (between 13 and 45%) of a copolymer of styrene and acrylonitrile have been grafted. The preferred graft polyol for use in the present invention is a polymer consisting of the ethylene oxide propylene oxide ether of glycerin to which 45% of a copolymer of styrene and acrylonitrile has been grafted.

According to the invention, polyether or polyester polyols are reacted in situ under the usual polyurethane foam forming conditions with an isocyanate and small amounts of an antistatic agent (e.g., from about 0.08 to 0.20 php of TCNQ or from about 0.06 to 1.00 php of sodium perchlorate). The foam forming reaction is conducted in the presence of the usual foam forming ingredients including catalyst compounds (such as tertiary amines and organo tin compounds) cell control agents and water to provide a polyurethane foam having an electrical resistivity of about $10^{12}$ ohm·cm or less at ambient room temperature. The electrically conductive polyurethane foam product may be advantageously reticulated with the thermal reticulation technique taught in Geen, U.S. Pat. No. 3,750,025. In this procedure the three dimensional foam product is placed in a sealed gas-filled chamber filled with a combustible gas and the gas ignited to produce an explosion and a flame front in which the foam is exposed to momentary plasma temperatures in excess of 2000° C. However, any of the thermal reticulation procedures known in the art can be used to reticulate the foam of the present invention.

It has been found that polyurethane foams made with in situ antistatic agents are stable and retain their enhanced electrical conductivity properties at high temperatures (e.g., 120° F. to 160° F.), low temperatures (e.g., 0° F. to −30° F.) and long term immersion in aqueous and organic liquids.

The invention will be illustrated in the following tables and working examples. With reference to the examples, foam formulations are based on 100 parts by weight of polyol, as is customary. All other components are added in parts by weight per hundred parts by weight of polyol (php), unless otherwise noted. "E n" is a convenient shorthand notation for the expression: "$\times 10^n$".

The volume resistivity of the polyurethane foam product was measured using the following equipment and procedures (described in ASTM-D-257-78 and MIL-F-87260 [USAF]). A 10" diameter and 1" thick sample of foam was placed on a base electrode. An inner electrode with a 10.6 cm diameter and an outer guard ring with a 15.2 cm inner diameter were placed on top of the foam sample. The electrodes were centered directly over each other to produce a vertical "field" between the plates. The megohmmeter (Beckman Megohmmeter model L-8 or equivalent) voltage was set to 500 volts and the variable resistance adjusted until a resistance reading was obtained on the meter. After a one minute stabilization period, the resistance was recorded. Volume resistivity was calculated as follows:

$$ev = \frac{\text{measured resistance (ohm)} \times 144.07 \text{ (cm}^2\text{)}}{\text{sample thickness (inches)} \times 2.54 \text{ (cm/in.)}}$$

This procedure and apparatus were used for the measurements reported in the Examples.

It has been found that foaming with in situ TCNQ or sodium perchlorate produces adequate antistatic properties in conventional polyurethane foams with as little as about 0.08 php of TCNQ or about 0.06 php of sodium perchlorate.

Although thermal reticulation of the foam products is preferred (due to cost and speed considerations) the other reticulation techniques that are well known in the art including, for example, immersion of the foam in dilute alkaline solution (this works for ester foams only) and exposure to high pressure water and ultra sound may also be used to reticulate conductive foams made with the antistatic agents according to the invention.

The electrically conductive foam materials of the present invention may be employed in a variety of military, industrial and consumer applications. When shaped in the appropriate configuration and sized to the proper dimension, these foam products can be used, for example, as packaging material for voltage sensitive computer parts to protect them against static electric discharges (e.g., Large Scale Integrated Circuits), in medical applications (e.g., as grounding mats for operating room equipment) or as an antistatic carpet underlay. A particularly preferred application for these foams is as a filler material in vehicular fuel tanks and especially those installed in military aircraft or racing cars.

The following examples will aid in explaining, but should not be deemed as limiting, the practice of the present invention. In all cases, unless otherwise noted, all parts and percentages are by weight.

It is understood that the foregoing description is given merely by way of illustration and that many variations may be made therein without departing from the spirit of this invention.

EXAMPLE 1

A polyol mixture is prepared from 50 parts of a polyether polyol (Voranol 3010—Dow Chemical) and 50 parts of a graft polyol (HS100 from Arco). The polyol mixture (100 total parts) is reacted with 58.2 parts of TDI (toluene diisocyanate—TD80 from Olin Corp.), 4.8 parts water, 0.5 parts tin catalyst (T-9 from Air Products), 1.0 part amine catalyst 1 (C124—Niax A-1, a proprietary tertiary amine product of Air Products, in dipropylene glycol in a ratio of 1:6), 1.1 parts amine catalyst 2 (NEM from Air Products), 1.2 parts of a silicone surfactant (L6202 from OSi), 2.0 parts of a pigment (4824 from Ferro/PDI), 0.08 parts TCNQ and 5.0 parts NMP (N-methyl pyrrolidone). The isocyanate index was 110 (i.e., a 10% excess of isocyanate over the stoichiometric amount).

All of the above ingredients except the isocyanate were combined in a vessel and mixed thoroughly to form a mixture. The TCNQ was added as a solution of the TCNQ in the NMP. The isocyanate was then added to the mixture and further mixing was performed to form a final mixture. The final mixture was then poured into a box shaped vessel and allowed to rise into a foam. After the foam had stopped rising, the vessel containing the foam was placed into an oven at 250° F. for one hour to cure. After the one hour curing period, the foam was removed from the vessel as the final foam product.

The foam produced in this example had a density of 1.4 lbs/ft$^3$.

The resistivity (volume resistivity in ohms·cm) of the foam produced in this example was measured at various temperatures. The results are reported in Table 1.

EXAMPLE 2

A polyol mixture is prepared from 50 parts of a polyether polyol (Voranol 3010—Dow Chemical) and 50 parts of a graft polyol (HS100 from Arco). The polyol mixture (100 total parts) is reacted with 38.4 parts of TDI (toluene diisocyanate—TD80 from Olin Corp.), 25.5 parts of TDI (TD65 from Olin Corp.), 5.6 parts water, 0.5 parts tin catalyst (T-9 from Air Products), 1.0 part amine catalyst 1 (C124—Niax A-1, a proprietary tertiary amine product of Air Products, in dipropylene glycol in a ratio of 1:6), 1.1 parts amine catalyst 2 (NEM from Air Products), 1.0 part of a silicone surfactant (L6202 from OSi), 2.0 parts of a pigment (4824 from Ferro/PDI) and 0.1 parts TCNQ. The isocyanate index was 105 (i.e., a 5% excess of isocyanate over the stoichiometric amount).

All of the above ingredients except the isocyanates were combined in a vessel and mixed thoroughly to form a mixture. The TCNQ was added in powder form (TCNQ powder was obtained from TCI America, 9211 N. Harbor Gate Street, Portland, Oreg. 97203). The isocyanates were then added to the mixture and further mixing was performed to form a final mixture. The final mixture was then poured into a box shaped vessel and allowed to rise into a foam. After the foam had stopped rising, the vessel containing the foam was placed into an oven at 250° F. for one hour to cure. After the one hour curing period, the foam was removed from the vessel as the final foam product.

The foam produced in this example had a density of 1.2 lbs/ft$^3$.

The resistivity (volume resistivity in ohms·cm) of the foam produced in this example was measured at various temperatures. The results are reported in Table 1.

EXAMPLE 3

A polyol mixture is prepared from 50 parts of a polyether polyol (Voranol 3010—Dow Chemical) and 50 parts of a graft polyol (HS100 from Arco). The polyol mixture (100 total parts) is reacted with 38.4 parts of TDI (toluene diisocyanate—TD80 from Olin Corp.), 25.5 parts of TDI (TD65 from Olin Corp.), 5.6 parts water, 0.5 parts tin catalyst (T-9 from Air Products), 1.0 part amine catalyst 1 (C124—Niax A-1, a proprietary tertiary amine product of Air Products, in dipropylene glycol in a ratio of 1:6), 1.1 parts amine catalyst 2 (NEM from Air Products), 1.0 parts of a silicone surfactant (L6202 from OSi), 2.0 parts of a pigment (4824 from Ferro/PDI) and 0.2 parts TCNQ. The isocyanate index was 105 (i.e., a 5% excess of isocyanate over the stoichiometric amount).

All of the above ingredients except the isocyanates were combined in a vessel and mixed thoroughly to form a mixture. The TCNQ was added in powder form (TCNQ powder obtained from TCI America, Portland, Oreg.). The isocyanates were then added to the mixture and further mixing was performed to form a final mixture. The final mixture was then poured into a box shaped vessel and allowed to rise into a foam. After the foam had stopped rising, the vessel containing the foam was placed into an oven at 250° F. for one hour to cure. After the one hour curing period, the foam was removed from the vessel as the final foam product.

The foam produced in this example had a density of 1.2 lbs/ft$^3$.

The resistivity (volume resistivity in ohms·cm) of the foam produced in this example was measured at various temperatures. The results are reported in Table 1.

EXAMPLE 4

A polyol mixture is prepared from 50 parts of a polyether polyol (Voranol 3010—Dow Chemical) and 50 parts of a graft polyol (HS100 from Arco). The polyol mixture (100 total parts) is reacted with 48.9 parts of TDI (toluene diisocyanate—TD80 from Olin Corp.), 4.1 parts water, 0.25 parts tin catalyst (T-9 from Air Products), 1.0 part amine catalyst 1 (C124—Niax A-1, a proprietary tertiary amine product of Air Products, in dipropylene glycol in a ratio of 1:6), 1.1 parts amine catalyst 2 (NEM from Air Products), 1.2 parts of a silicone surfactant (L6202 from OSi), 2.0 parts of a pigment (4824 from Ferro/PDI) and 0.25 parts MP100 (from Akishima Chemical Industries Co., Ltd., Tokyo, Japan). The isocyanate index was 110 (i.e., a 10% excess of isocyanate over the stoichiometric amount).

All of the above ingredients except the isocyanate were combined in a vessel and mixed thoroughly to form a mixture. The isocyanate was then added to the mixture and further mixing was performed to form a final mixture. The final mixture was then poured into a box shaped vessel and allowed to rise into a foam. After the foam had stopped rising, the vessel containing the foam was placed into an oven at 250° F. for one hour to cure. After the one hour curing period, the foam was removed from the vessel as the final foam product.

The foam produced in this example had a density of 1.6 lbs/ft$^3$.

The resistivity (volume resistivity in ohms·cm) of the foam produced in this example was measured at various temperatures. The results are reported in Table 1.

EXAMPLE 5

A polyol mixture is prepared from 50 parts of a polyether polyol (Voranol 3010—Dow Chemical) and 50 parts of a graft polyol (HS100 from Arco). The polyol mixture (100 total parts) is reacted with 48.9 parts of TDI (toluene diisocyanate—TD80 from Olin Corp.), 4.1 parts water, 0.25 parts tin catalyst (T-9 from Air Products), 1.0 part amine catalyst 1 (C124—Niax A-1, a proprietary tertiary amine product of Air Products, in dipropylene glycol in a ratio of 1:6), 1.1 parts amine catalyst 2 (NEM from Air Products), 1.2 parts of a silicone surfactant (L6202 from OSi), 2.0 parts of a pigment (4824 from Ferro/PDI) and 0.50 parts MP100 (from Akishima Chemical Industries Co., Ltd., Tokyo, Japan). The isocyanate index was 110 (i.e., a 10% excess of isocyanate over the stoichiometric amount).

All of the above ingredients except the isocyanate were combined in a vessel and mixed thoroughly to form a mixture. The isocyanate was then added to the mixture and further mixing was performed to form a final mixture. The final mixture was then poured into a box shaped vessel and allowed to rise into a foam. After the foam had stopped rising, the vessel containing the foam was placed into an oven at 250° F. for one hour to cure. After the one hour curing period, the foam was removed from the vessel as the final foam product.

The foam produced in this example had a density of 1.6 lbs/ft$^3$.

The resistivity (volume resistivity in ohms·cm) of the foam produced in this example was measured at various temperatures. The results are reported in Table 1.

EXAMPLE 6

A polyol mixture is prepared from 50 parts of a polyether polyol (Voranol 3010—Dow Chemical) and 50 parts of a graft polyol (HS100 from Arco). The polyol mixture (100 total parts) is reacted with 48.9 parts of TDI (toluene diisocyanate—TD80 from Olin Corp.), 4.1 parts water, 0.25 parts tin catalyst (T-9 from Air Products), 1.0 part amine catalyst 1 (C124—Niax A-1, a proprietary tertiary amine product of Air Products, in dipropylene glycol in a ratio of 1:6), 1.1 parts amine catalyst 2 (NEM from Air Products), 1.2 parts of a silicone surfactant (L6202 from OSi), 2.0 parts of a pigment (4824 from Ferro/PDI) and 1.0 parts MP100 (from Akishima Chemical Industries Co., Ltd., Tokyo, Japan). The isocyanate index was 110 (i.e., a 10% excess of isocyanate over the stoichiometric amount).

All of the above ingredients except the isocyanate were combined in a vessel and mixed thoroughly to form a mixture. The isocyanate was then added to the mixture and further mixing was performed to form a final mixture. The final mixture was then poured into a box shaped vessel and allowed to rise into a foam. After the foam had stopped rising, the vessel containing the foam was placed into an oven at 250° F. for one hour to cure. After the one hour curing period, the foam was removed from the vessel as the final foam product.

The foam produced in this example had a density of 1.6 lbs/ft$^3$.

The resistivity (volume resistivity in ohms·cm) of the foam produced in this example was measured at various temperatures. The results are reported in Table 1.

EXAMPLE 7

A polyol mixture is prepared from 50 parts of a polyether polyol (Voranol 3010—Dow Chemical) and 50 parts of a graft polyol (HS100 from Arco). The polyol mixture (100 total parts) is reacted with 48.9 parts of TDI (toluene diisocyanate—TD80 from Olin Corp.), 4.1 parts water, 0.25 parts tin catalyst (T-9 from Air Products), 1.0 part amine catalyst 1 (C124—Niax A-1, a proprietary tertiary amine product of Air Products, in dipropylene glycol in a ratio of 1:6), 1.1 parts amine catalyst 2 (NEM from Air Products), 1.2 parts of a silicone surfactant (L6202 from OSi), 2.0 parts of a pigment (4824 from Ferro/PDI) and 2.0 parts MP100 (from Akishima Chemical Industries Co., Ltd., Tokyo, Japan). The isocyanate index was 110 (i.e., a 10% excess of isocyanate over the stoichiometric amount).

All of the above ingredients except the isocyanate were combined in a vessel and mixed thoroughly to form a mixture. The isocyanate was then added to the mixture and further mixing was performed to form a final mixture. The final mixture was then poured into a box shaped vessel and allowed to rise into a foam. After the foam had stopped rising, the vessel containing the foam was placed into an oven at 250° F. for one hour to cure. After the one hour curing period, the foam was removed from the vessel as the final foam product.

The foam produced in this example had a density of 1.6 lbs/ft$^3$.

The resistivity (volume resistivity in ohms·cm) of the foam produced in this example was measured at various temperatures. The results are reported in Table 1.

EXAMPLE 8 (COMPARISON)

A polyol mixture is prepared from 50 parts of a polyether polyol (Voranol 3010—Dow Chemical) and 50 parts of a graft polyol (HS100 from Arco). The polyol mixture (100 total parts) is reacted with 58.2 parts of TDI (toluene diisocyanate—TD80 from Olin Corp.), 4.8 parts water, 0.5 parts tin catalyst (T-9 from Air Products), 1.0 part amine catalyst 1 (C124—Niax A-1, a proprietary tertiary amine product of Air Products, in dipropylene glycol in a ratio of 1:6), 1.1 parts amine catalyst 2 (NEM from Air Products), 1.2 parts of a silicone surfactant (L6202 from OSi), 2.0 parts of a pigment (4824 from Ferro/PDI) and 5.0 parts NMP (N-methyl pyrrolidone). The isocyanate index was 110 (i.e., a 10% excess of isocyanate over the stoichiometric amount).

All of the above ingredients except the isocyanate were combined in a vessel and mixed thoroughly to form a mixture. The isocyanate was then added to the mixture and further mixing was performed to form a final mixture. The final mixture was then poured into a box shaped vessel and allowed to rise into a foam. After the foam had stopped rising, the vessel containing the foam was placed into an oven at 250° F. for one hour to cure. After the one hour curing period, the foam was removed from the vessel as the final foam product.

The foam produced in this example had a density of 1.5 lbs/ft$^3$.

The resistivity (volume resistivity in ohms·cm) of the foam produced in this example was measured at room temperature. The result is reported in Table 1.

TABLE 1

| | | | | Volume Resistivity | | | | |
|---|---|---|---|---|---|---|---|---|
| Temp. | Ex. 1 | Ex. 2 | Ex. 3 | Ex. 4 | Ex. 5 | Ex. 6 | Ex. 7 | Ex. 8 |
| 70° F. | 5.3E11 | 8.5E11 | 3.4E11 | 1.1E12 | 4.1E11 | 3.3E11 | 1.5E.11 | 1.19E14 |
| 20° F. | | 5.7E13 | 1.8E13 | 2.7E14 | 5.9E13 | 5.1E13 | 3.1E13 | |
| 0° F. | 6.8E13 | 5.7E14 | 1.0E14 | | 3.4E14 | 2.8E14 | 1.6E14 | |
| −30° F. | | 8.5E14 | 1.4E15 | | | >1.0E14 | 8.5E14 | |

The static decay properties of the foams of Examples 1 and 8 were compared by applying a 5000 volt charge to a 3" by 5" by 0.50" piece of the foam at about 70° F. (room temperature) and measuring the time required for the foam to dissipate 90% of the charge. Each piece was subjected to a positive 5000 volt charge and a negative 5000 volt charge. The results are shown in Table 2.

TABLE 2

| Polarity of 5000 Volt Charge | + | − |
|---|---|---|
| Dissipation Time for Foam of Example 1 | 0.71 seconds | 0.72 seconds |
| Dissipation Time for Foam of Example 8 | >500 seconds | 320 seconds |

From the above examples it can be seen that the foams of the present invention that contain TCNQ or sodium perchlorate have a reduced electrical resistivity and an excellent static decay rate in comparison to conventional polyurethane foams with identical or equivalent compositions which do not contain TCNQ or sodium perchlorate.

What is claimed is:

1. A three dimensional electrically conductive plastic foam structure comprising a polyurethane foam containing an effective amount for lowering the volume resistivity of said foam of an antistatic agent consisting essentially of tetracyanoquinodimethane.

2. A three dimensional electrically conductive structure according to claim 1, wherein said structure is prepared by reacting a polyol and an isocyanate and comprises 0.08 to 0.20 parts per hundred parts by weight of said polyol of said tetracyanoquinodimethane as said antistatic agent.

3. A three dimensional electrically conductive structure according to claim 1, wherein said polyurethane foam comprises a reticulated polyurethane foam.

4. A three dimensional electrically conductive structure according to claim 1, wherein said polyurethane foam is formed from at least one polyol and at least one isocyanate and further wherein said antistatic agent is tetracyanoquinodimethane which is dissolved in a suitable solvent.

5. A three dimensional electrically conductive structure according to claim 1, wherein said polyurethane foam is formed from a reaction mixture containing at least one polyol and at least one isocyanate and further wherein said antistatic agent is tetracyanoquinodimethane which is not dissolved in a solvent but is added directly to the reaction mixture.

6. A three dimensional electrically conductive structure according to claim 2, wherein said polyurethane foam contains 0.08 to 0.15 parts per hundred parts by weight of said polyol of said tetracyanoquinodimethane.

7. A three dimensional electrically conductive structure according to claim 2, wherein said polyurethane foam contains 0.10 to 0.15 parts per hundred parts by weight of said polyol of said tetracyanoquinodimethane.

8. A three dimensional electrically conductive structure having a volume resistivity at about 70° F. of less than $10^{12}$ ohm·cm, comprising a polyurethane foam containing an effective amount for reducing the electrical resistivity of said foam to less than $10^{12}$ ohm·cm of an antistatic agent consisting essentially of tetracyanoquinodimethane incorporated into said foam in situ.

9. A three dimensional electrically conductive structure according to claim 8, wherein said antistatic agent is tetracyanoquinodimethane which is present in an amount of from about 0.08 to 0.20 php.

10. A method of preparing an electrically conductive polyurethane foam composition which comprises reacting, under foam forming conditions, at least one polyester or polyether polyol with an isocyanate compound in the presence of an effective amount for lowering the electrical resistance of said polyurethane foam of an antistatic agent consisting essentially of tetracyanoquinodimethane.

11. A method according to claim 10, wherein said electrically conductive polyurethane foam has an electrical resistivity of less than $10^{12}$ ohm·cm at about 70° F.

12. A method according to claim 10, wherein said antistatic agent is tetracyanoquinodimethane and the amount of said tetracyanoquinodimethane in said polyurethane foam composition is from about 0.08 to 0.20 php.

* * * * *